United States Patent
Hu et al.

(10) Patent No.: US 10,860,185 B2
(45) Date of Patent: Dec. 8, 2020

(54) CONTENT ITEM ACTIVITY FEED FOR PRESENTING EVENTS ASSOCIATED WITH CONTENT ITEMS

(71) Applicant: Dropbox, Inc., San Francisco, CA (US)

(72) Inventors: Bo Hu, Hillsborough, CA (US); Maxime Larabie-Bélanger, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 16/887,230

(22) Filed: May 29, 2020

(65) Prior Publication Data

US 2020/0293169 A1    Sep. 17, 2020

Related U.S. Application Data

(63) Continuation of application No. 15/892,304, filed on Feb. 8, 2018, now Pat. No. 10,684,749, which is a continuation of application No. 14/865,972, filed on Sep. 25, 2015, now Pat. No. 9,898,172.

(51) Int. Cl.
| | |
|---|---|
| *G06F 3/0484* | (2013.01) |
| *H04L 12/58* | (2006.01) |
| *G06F 9/451* | (2018.01) |
| *H04L 29/08* | (2006.01) |
| *H04L 29/06* | (2006.01) |

(52) U.S. Cl.
CPC ............ *G06F 3/0484* (2013.01); *G06F 9/451* (2018.02); *H04L 51/046* (2013.01); *H04L 51/16* (2013.01); *H04L 65/4084* (2013.01); *H04L 65/602* (2013.01); *H04L 67/2823* (2013.01); *H04L 51/18* (2013.01)

(58) Field of Classification Search
CPC ........................................................ G06F 3/0484
USPC ........................................................ 715/751
See application file for complete search history.

(56) References Cited

U.S. PATENT DOCUMENTS

| | | | |
|---|---|---|---|
| 7,254,593 B2 | 8/2007 | Albornoz et al. | |
| 8,091,108 B2 | 1/2012 | Gupta et al. | |
| 8,892,553 B2 | 11/2014 | Norlander et al. | |
| 9,391,995 B2 | 7/2016 | Stuntebeck | |
| 10,684,749 B2 * | 6/2020 | Hu | H04L 65/602 |
| 2011/0191303 A1 * | 8/2011 | Kaufman | G06F 16/21 |
| | | | 707/684 |
| 2013/0054509 A1 | 2/2013 | Kass et al. | |

(Continued)

OTHER PUBLICATIONS

Final Office Action from U.S. Appl. No. 15/892,304, dated Feb. 12, 2020, 20 pages.

(Continued)

*Primary Examiner* — William D Titcomb
(74) *Attorney, Agent, or Firm* — Fenwick & West LLP

(57) ABSTRACT

A content management system provides event data relating to other users' activity or interactions with a content item for display in an activity feed provided in conjunction with a user interface of a native application displaying the content item. Though provided in conjunction with the native application, the event data is maintained separate from the content data of the content item and displayed in the activity feed by an application separate from the native application of the content item. The activity feed permits users to exchange chat messages and retrieve information for multiple versions of the content item.

20 Claims, 13 Drawing Sheets

(56) References Cited

U.S. PATENT DOCUMENTS

| | | |
|---|---|---|
| 2013/0212250 A1 | 8/2013 | Kleppner et al. |
| 2014/0223333 A1 | 8/2014 | Pegg et al. |
| 2014/0304618 A1 | 10/2014 | Carriero et al. |
| 2015/0220317 A1 | 8/2015 | Li et al. |
| 2015/0288756 A1 | 10/2015 | Larabie-Belanger et al. |
| 2015/0288757 A1 | 10/2015 | Larabie-Belanger |
| 2015/0288774 A1 | 10/2015 | Larabie-Belanger et al. |
| 2015/0288775 A1 | 10/2015 | Larabie-Belanger |
| 2016/0259508 A1 | 9/2016 | Eccleston |

OTHER PUBLICATIONS

Non-Final Office Action from U.S. Appl. No. 15/892,304, dated Oct. 11, 2019, 20 pages.
Notice of Allowance from U.S. Appl. No. 15/892,304, dated Apr. 9, 2020, 6 pages.

\* cited by examiner

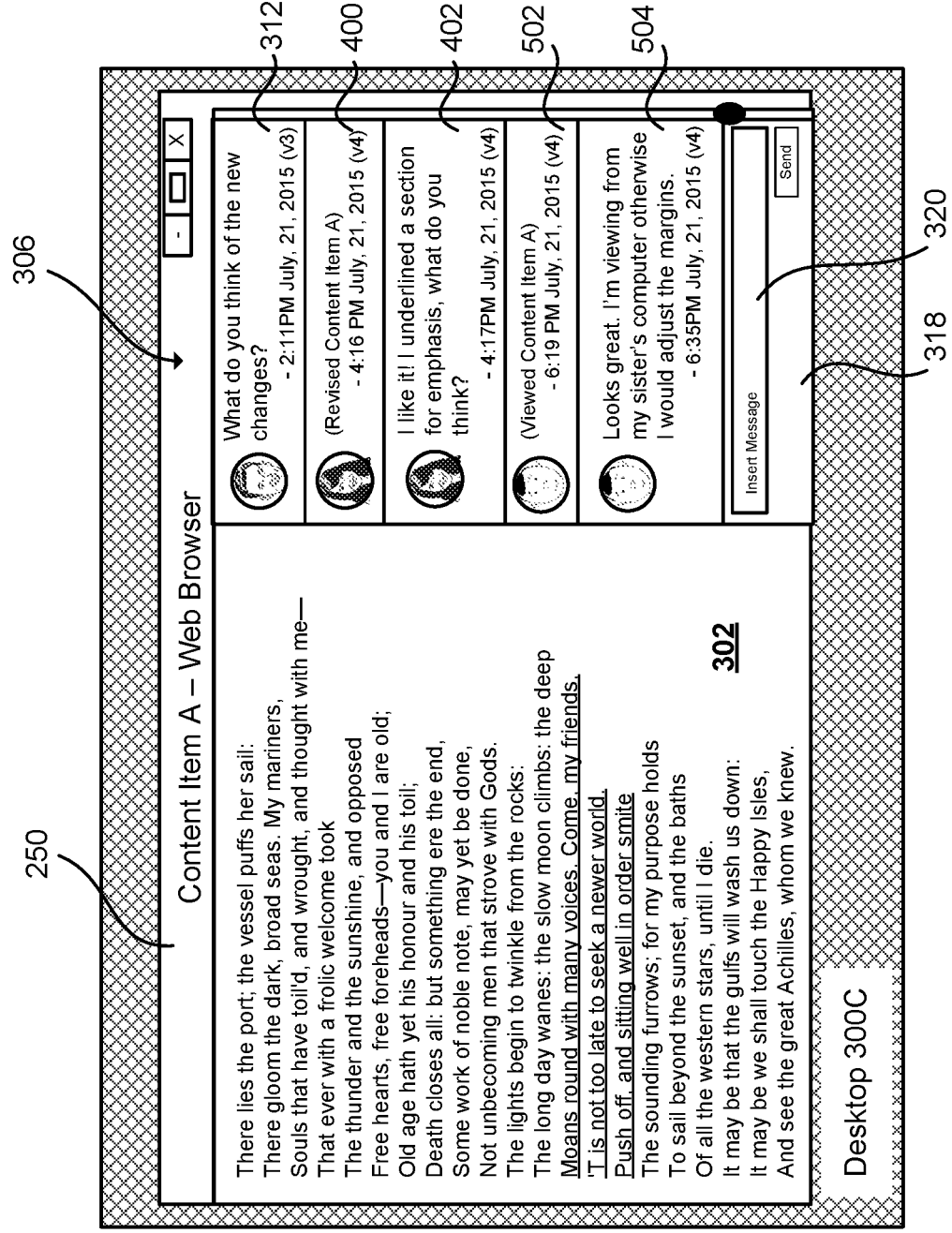

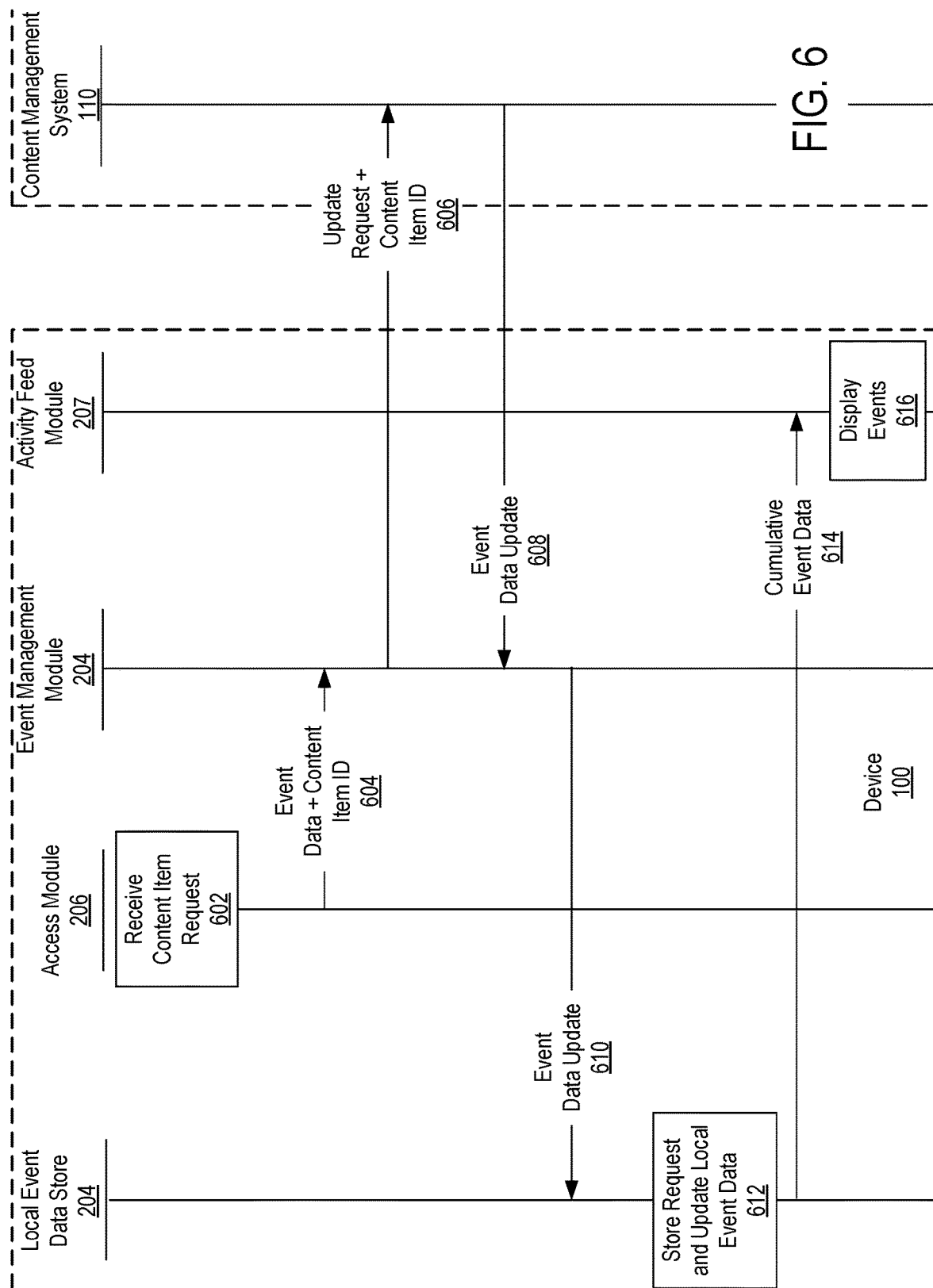

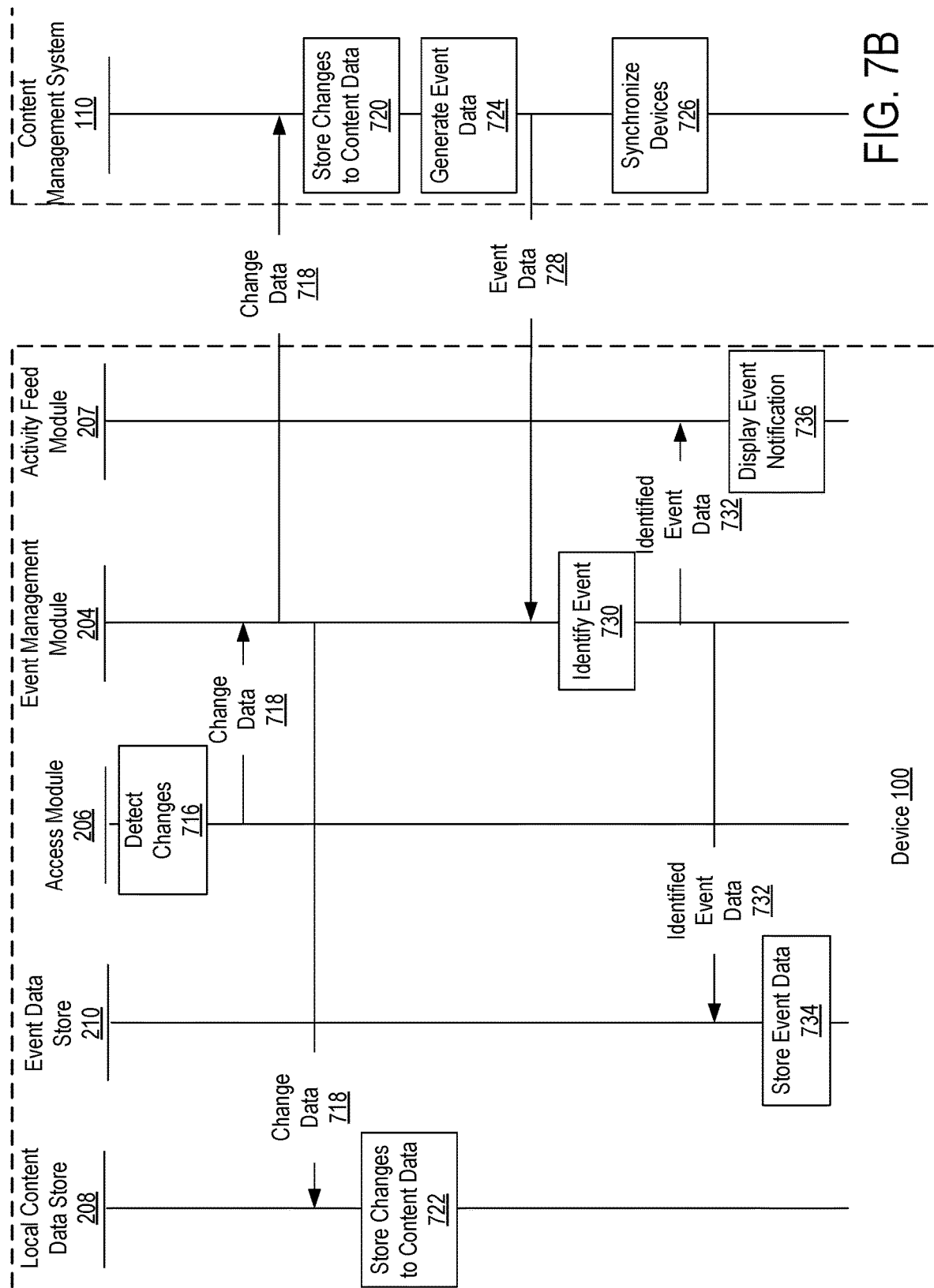

Content Event Log
900

| <eventID> | <contentId> | <versionID> | <timestamp> | <UserID> | <textofevent> |
|---|---|---|---|---|---|
| a1 | abc123 | v1 | 20:01_091215 | f156gs | 0 |
| a2 | abc123 | v1 | 06:09_091315 | bk1987 | 0 |
| c1 | def456 | v3 | 08:16_091315 | r5t97ff | "Looks great, thank you!" |
| c2 | def456 | v3 | 08:17_091315 | 3er7d8 | "You're welcome" |
| b1 | abc123 | v2 | 09:09_091315 | bk1987 | 0 |
| c2 | abc123 | v3 | 08:17_091315 | 3er7d8 | "I like the changes you just made" |

CONTENT ITEM ACTIVITY FEED FOR PRESENTING EVENTS ASSOCIATED WITH CONTENT ITEMS

CROSS REFERENCE TO RELATED APPLICATIONS

This application is a continuation of U.S. application Ser. No. 15/892,304, filed Feb. 8, 2018, now U.S. Pat. No. 10,684,749, which application is a continuation of U.S. application Ser. No. 14/865,972, filed Sep. 25, 2015, now U.S. Pat. No. 9,898,172, which is incorporated by reference in its entirety.

BACKGROUND

This disclosure relates generally to maintaining and providing information for a content item for display, and particularly to maintaining information corresponding to content item events and providing this information to users for display.

Content management systems permit devices to synchronize content items with a content management system and other devices. A device stores a local copy of content items. When content items are added, deleted, or edited on a device, these modifications are sent to the content management system for storage and synchronization with other devices. To interact with a content item, users typically execute a native application on the device to view and modify the content item. Modifications to a content item may be synchronized with the content management system separately from the execution of the native application.

Accordingly, multiple users may use respective devices to separately view and edit a particular content item. When multiple users collaboratively edit, draft, or otherwise work with the same content item, however, it becomes difficult for the users identify changes made by other users, to determine if they have opened the latest version of the content item, to know if other users have made changes to the content item since they last opened the content item, and so forth. Such an environment where multiple users are separately viewing and editing a content item can lead to confusion and other inefficiencies.

SUMMARY

A content management system maintains a content event log storing content item event data and other metadata relating to revisions, edits, user chat messages or comments, and other interactions made to a content item, and provides this event information for display in an activity feed to the client devices of the various users. The event information in the activity feed enables users who have access to the document to identify edits to the document, as well as different versions of the document, comment on the document itself, and exchange messages with other users, without necessarily modifying the actual content data of the document to store the comments and messages associated with the document.

A computing device, via a client application of the content management system, stores a local copy of a shared content item that is also stored, maintained, and synchronized between devices by the content management system. The device also includes a native content application, such as a word processor, media viewer, media editor, and so forth that can be used to access the content item. The native application displays content data of the content item in a user interface element, such as a window. The client application is programmatically configured to interact with the content management system and access the content event log to monitor activity or interactions with the content item on the device and communicate information about these events to the content management system, which then provides this data to other devices sharing the content item. The client application aggregates and provides the event data including data describing the event, such as the user generating the event, the type of event, when the event occurred, what version of the content item the event corresponds to, and so forth, to facilitate collaboration between users, for example.

The event data stored in the content event log can, for example, include interactions with the client application or the native application concerning content item events, such as opening a content item, editing, revising, or making changes to a content item, saving a content item, renaming a content item, saving the content item as a new version or new document, moving a content item, deleting a content item, submitting a message, and so forth. In one embodiment, the event data is received by the client application associated with the content management system, which is separate from and independent of the native application interacting with the content item. That is, in this embodiment the events are received or gathered by another application or process that is not, nor is it integrated into, the native application for the content item.

Additional types of event data can include notes, user views, messages, notification requests, and comments related to the content item that may be received by the client application and which are also separate from the native application that is providing the content item. Messages may include chat messages to other devices or comments referring to the content item. Event data can also include metadata modifications, such as versioning notes, or requests for further information stored at the content management system about the content item, such as a request to view versioning information or prior content item versions. The event data is, for example, exchanged and displayed by the devices to provide users with information regarding other user's interactions with or modifications to the content item. Thus, the event data is generated for at least two types of events: exogenous events that are generated by the content application (for operations that take place by the content application) and endogenous (generated by the client application of the content management system, such as messages, comments, etc.). Exogenous events are received, and then metadata describing such exogenous events is generated to represent them in the event log. For endogenous events, the metadata is likewise used to represent the event.

The content management system stores and maintains the content data for the content item and also separately stores and maintains content data for various versions, and other updates or changes to the content item, apart from the content data of the content item itself. The updates and changes to the content data are received by the content management system via the client application and the associated event data is stored in the event log; the event log may be stored as a disk file, in a database, or in some other format. In one embodiment, each client devices register with the content management system and associated with metadata to receive event data for a shared content item, may be configured to specify a particular activity to trigger an event notification. When the specified activity occurs, the event data is sent to devices associated with the content item to receive the event notification in an activity feed window for the content item that is separate from the native application for the content item.

Accordingly, the client devices display the event notification relating to other users' activity or interactions with a content item in the activity feed that is provided in conjunction with a user interface of the native application concurrently displaying the content item itself. For example, the content item may be displayed in a main window, and the activity feed window may be concurrently displayed in a side window adjacent the main window. This permits users to view, in essentially real or near real-time, the activity or progress of other users with respect to a content item. In addition, by presenting user interfaces to communicate with the content management system alongside the native content application, the activity feed window permits users to exchange chat messages and retrieve data about a content item while the content item is being displayed.

Further, because the client application is independent of native application, it can be used to provide activity feed information for native content applications which themselves do not provide any programmatic support for tracking versions, commenting, or exchanging messages. This enables the client applications to further extend the functionality of such limited native applications.

BRIEF DESCRIPTION OF THE DRAWINGS

FIG. 5 shows the event information of FIGS. 3-4 reflected in an activity feed for a preview of the shared content item displayed in a web browser to a third user.

FIG. 6 shows an interaction diagram for displaying activity information for a content item, according to one embodiment.

FIG. 7B shows an interaction diagram for receiving event data generated by a content management system, according to one embodiment.

FIG. 9 shows a data schema within a content management system, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
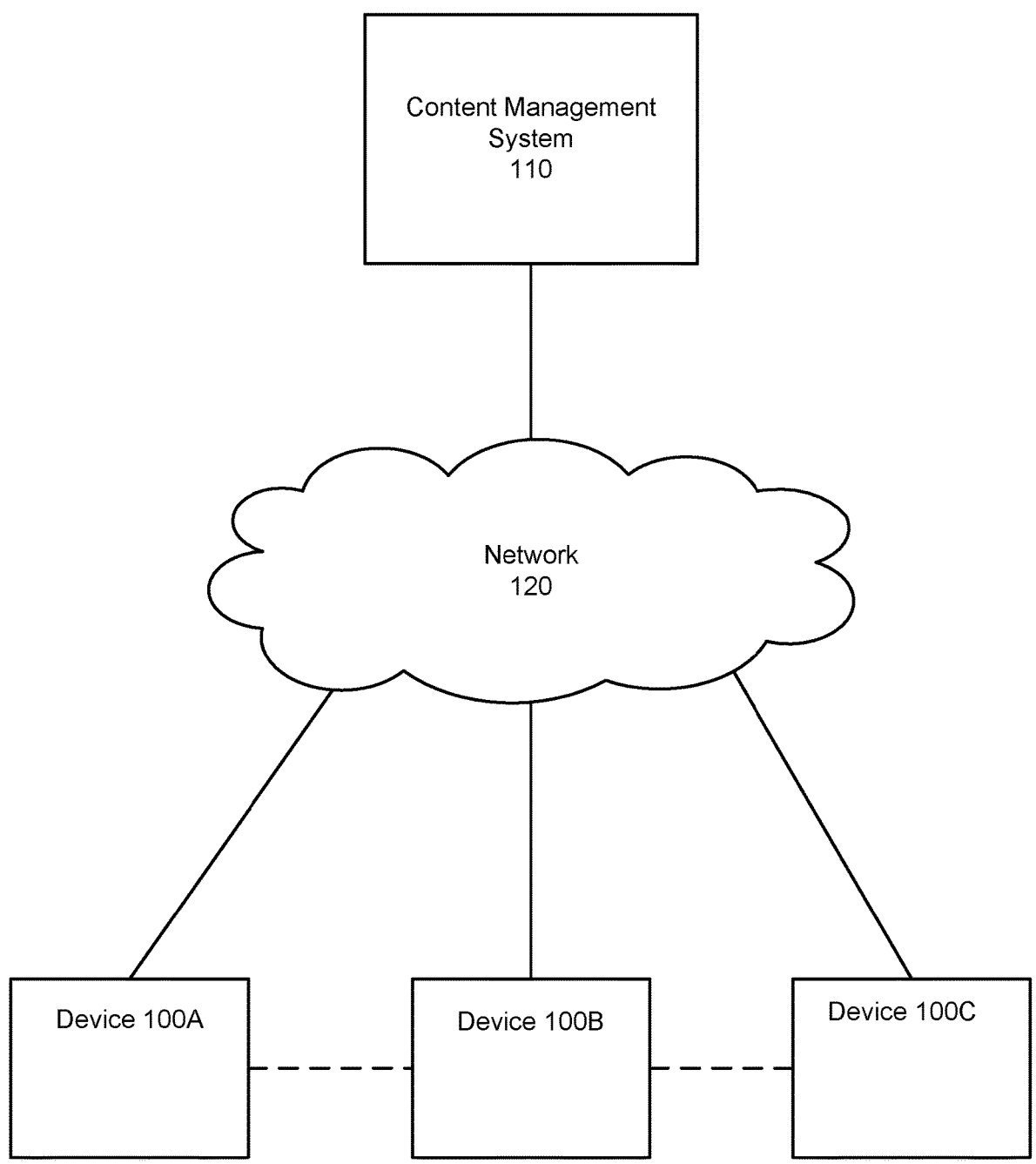
FIG. 1 shows an embodiment of an environment for content item synchronization including the display of event information to other users in a shared environment.

FIG. 1 shows an example system environment for content item synchronization providing users with an activity feed of content item events, such as interactions, chat messages, or comments, for a content item to facilitate the sharing and collaborative editing of shared content items. FIG. 1 includes devices 100A, 100B, 100C (referred to generally as device 100), content management system 110, and network 120. Three devices are shown for purpose of illustration; in practice, however, any number of devices may be present in the environment. Similarly, other modules or components described and illustrated throughout may include single or multiple instances as appropriate to the needs of the implementer and without loss of generality.

Device 100 may be any suitable computing device for locally storing and viewing content items and synchronizing the content items with content management system 110. Examples of devices include desktop and laptop computers, hand-held mobile devices, tablet computers, and other computing devices. The operation of device 100 in various embodiments is further described below. In particular, each device 100 is configured by a client application 200 (described with respect to FIG. 2) that extends the operation of the client device 100 beyond the functionality for a generic computer device, as will be further described, and thereby improves the overall functionality of the device 100.

Each device 100 communicates with content management system 110 through network 120. Network 120 is any suitable network and may include local networks, corporate networks, global networks, and any combination of these. In typical configurations, devices 100 communicate via a wired or wireless communication network to a local network service provider, and communicate with content management system 110 through the Internet.

Content management system 110 provides content sharing and synchronization services for users of devices 100. These services allow users to share content with users of other devices 100. In addition to content sharing, content management system 110 updates shared content responsive to changes and enables synchronized changes to content items across multiple devices 100. Users who register with content management system 110 are provided with a user account and a user may synchronize content across multiple devices 100 associated with the user's account, and the user may share content that is synchronized with devices associated with other users' accounts.

Content stored by content management system 110 can include any type of data, such as digital data, documents, media (e.g., images, photos, videos, audio, streaming content), data files and databases, source and object code, recordings, and any other type of data or file, collectively referred to here as "content items." Content items stored by content management system 110 may also be used to organize other content items, such as folders, tables, collections, albums, playlists, or in other database structures (e.g., object oriented, key/value etc.). In practice, various devices 100 will be synchronized with different groups of content items, based on user associations, permissions, content sharing permissions, and so forth. The operation of content management system 110 in various embodiments is further described below.

Figure 2:
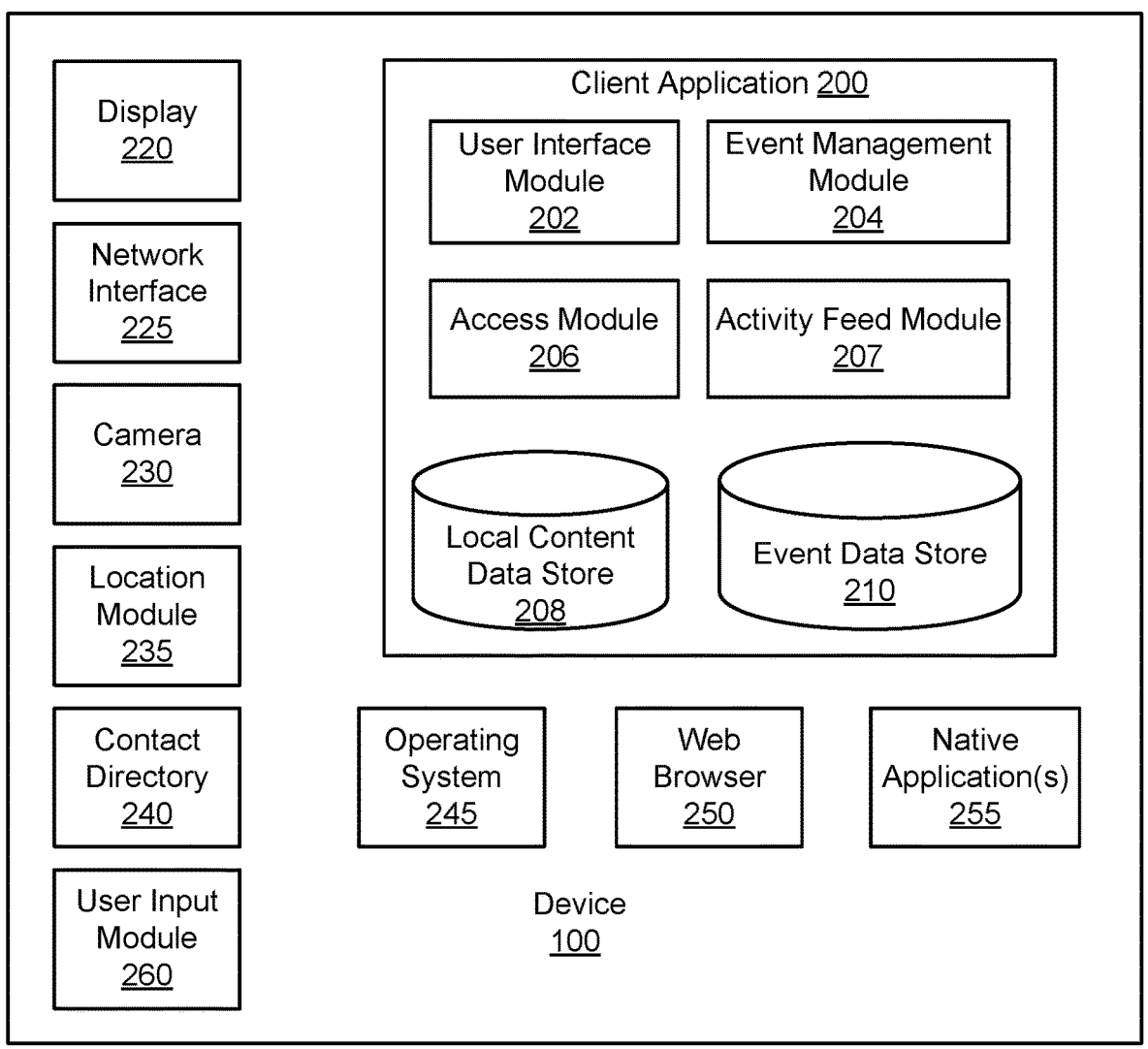
FIG. 2 shows various modules and components of a device, according to one embodiment.

FIG. 2 shows exemplary modules and components of device 100 in accordance with one embodiment. Device 100 includes display 220 for providing information to the user, and in certain client devices 100 includes a touchscreen. Device 100 also includes network interface 225 for communicating with content management system 110 via network 120. Device 100 also includes a user input module 260, which receives user inputs from various user input devices, such as a keyboard, a mouse, a trackpad, or other device. Other conventional components of a client device 100 that are not material are not shown, for example one or more computer processors, local fixed memory (RAM and ROM), as well as optionally removable memory (e.g., SD-card), power sources, and audio-video outputs.

Software modules include operating system 245 and one or more native applications 255. Native applications 255 vary based on client device, and may include various applications for creating, viewing, consuming, and modifying content stored on content management system 110, such as word processors, spreadsheets, database management systems, code editors, image and video editors, e-book readers, audio and video players, and the like. Operating system 245 on each device provides a local file management system and executes the various software modules such as content management system client application 200 and native application 255. A contact directory 240 stores information about the user's contacts, such as name, picture, telephone numbers, company, email addresses, physical address, website URLs, and the like. Further operation of native applications 255, operating system 245, and content management system client application 200 are described below.

In certain embodiments, device 100 includes additional components such as camera 230 and location module 235. Camera 230 may be used to capture images or video for upload to the online content management system 110. Location module 235 determines the location of device 100, using for example a global positioning satellite signal, cellular tower triangulation, or other methods. Location module 235 may be used by client application 200 to obtain location data and add the location data to metadata about a content item, such as an image captured by camera 230.

Client device 100 accesses content management system 110 in a variety of ways. Client application 200 can be a dedicated application or module that provides access to the services of content management system 110, providing both user access to shared files through a user interface, as well as programmatic access for other applications. Client device 100 may also access content management system 110 through web browser 250 by signing into a user account through a content management system webpage. As an alternative, client application 200 may integrate access to content management system 110 with the local file management system provided by operating system 245. When access to content management system 110 is integrated in the local file management system, a file organization scheme maintained at content management system 110 is represented as a local file structure by operating system 245 in conjunction with client application 200. Client application 200 may take various forms, such as a stand-alone application, an application plug-in, a browser extension, and so forth. Client application 200 includes user interface module 202, event management module 204, access module 206, activity feed module 207, local content data store 208, and event data store 210. The various modules and data stores are described separately throughout this disclosure for convenience and in various implementations may be combined or further divided into separate components as desired. The client application 200 generally, and the various modules specifically, are not conventional or routine elements of generic computing device 100.

Activity feed module 207 provides a user-interface activity feed displayed with the content item and includes an updated list or history of content item events, such as when a user changes the content data of a content item, renames the content item, creates a new version of the content item, views the content item, and so forth, and is one means for performing these functions. As displayed in the activity feed, these events notify users of updates to the content item and are referred to collectively herein as event notifications. Each event notification is stored by the content management system 110 in a manner that persistently associates it with one or more particular content items, thereby allowing the content management system 110 to selectively retrieve events specific to each content item, as well as to track events that relate to multiple content items. Thus, information helpful to the collaborative drafting, editing, and review of shared content items is displayed in the activity feed with the content item. Although separate from the native application of the content item, the activity feed may integrate with the native application to appear, when displayed, as if the activity feed was provided by the native application. Additionally, the activity feed could be displayed separate from the native application of the content item. In addition to displaying the event notifications for events pertinent to the collaborative drafting, editing, and review of shared content items, activity feed module 207 provides a message or chat interface enabling users to submit or provide messages in-line with the event notifications in the activity feed. Thus, the activity feed may also provide a chat function for users sharing the content item. Further, maintaining the events separate from the content items themselves, enables users who do not have the native content application necessary to edit a given content item installed on their client devices, to nonetheless see the events associated with a given content item in the activity feed, as well as contribute comments and messages. This further extends the functionality of the client device 100 beyond its generic capabilities.

Event management module 204 determines the event data to be provided to the activity feed module 207 for display, and is one means for performing this function. Event management module 204 receives various user interaction information corresponding to events (or other user activity) that takes place with respect to a content item from access module 206 and activity feed module 207 and additionally obtains and manages information relating to a user's synchronized content items. Each event has data corresponding to the type of event (i.e., a retrieval/open request), the user account making the request (e.g., user or account ID), a content ID identifying the content data which the event is associated (e.g., a unique ID, file name, pathname, or the like) a request timestamp, prior synchronization data corresponding to when content item 302 on device 100 was last synchronized or updated by content management system 110, and so forth. Events further include event data; for comment or message event, the data includes the text of the comment or message. Certain event types, such as a message event can include an identifier of the recipient(s) to whom the message is directed. It should be appreciated that event management module 204 could alternatively reside with content management system 110 or at least some of the processes described herein can be performed by content management system 110.

Access module 206 provides event management module 204 with content item interaction information for events, such as when a user opens or closes changes, or edits the content item and when a user renames or creates a new version of the content item, and is one means for performing this function. For example, access module 206 receives data corresponding to a change to the content data of a content item, notifies event management module 204, event management module 204 sends the changes to the content data to content management system 110, receives an event data update corresponding to the change from content management system 110, and stores the event data update in event data store 210. In one embodiment, access module 206 may additionally provide interaction information for user submitted messages received via the activity feed to event management module 204. Alternatively, the interaction information for message events may be provided to event management module 204 by activity feed module 207.

Client application 200 may store content accessed from a content storage at content management system 110 in local content data store 208. While represented here as within client application 200, local content data store 208 may be stored with other data for client device 100 in non-volatile storage. When local content data store 208 is stored this way, the content is available to the user and other applications or modules, such as native application 255, when client application 200 is not in communication with content management system 110.

Access module 206 manages updates to local content data store 208 and uses synchronization logic to communicate with content management system 110 to synchronize content modified by client device 100 with content maintained on content management system 110, and is one means for performing this function. One example of such synchronization is provided in U.S. Pat. Pub. US20150012488 filed Sep. 27, 2013 and is hereby incorporated by reference in its entirety.

Accordingly, device 100 receives content items from content management system 110, stores such items to local content data store 208, where they may be accessed and edited with various native applications 255 stored on the device 100. For example, device 100 may include a photo editing application that manipulates image content items, a word processing application that permits modification of text content items, or a computer-aided design (CAD) application that permits modification of drawing content items. Additionally, content management system 110 can share a content item with other users upon user request and provide users with read and write access.

Figure 3A:
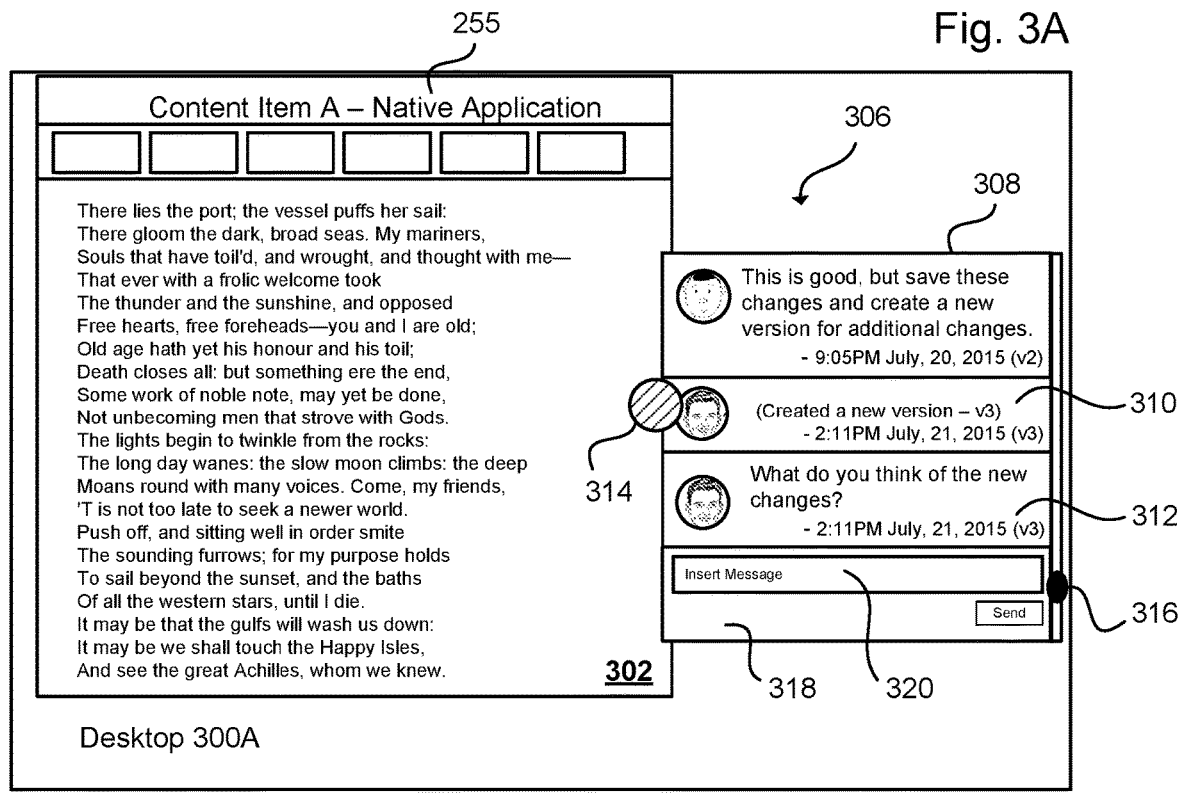
FIGS. 3A and 3B show event information provided by a first user being reflected in an activity feed for a shared content item to a second user.
Figure 3B:
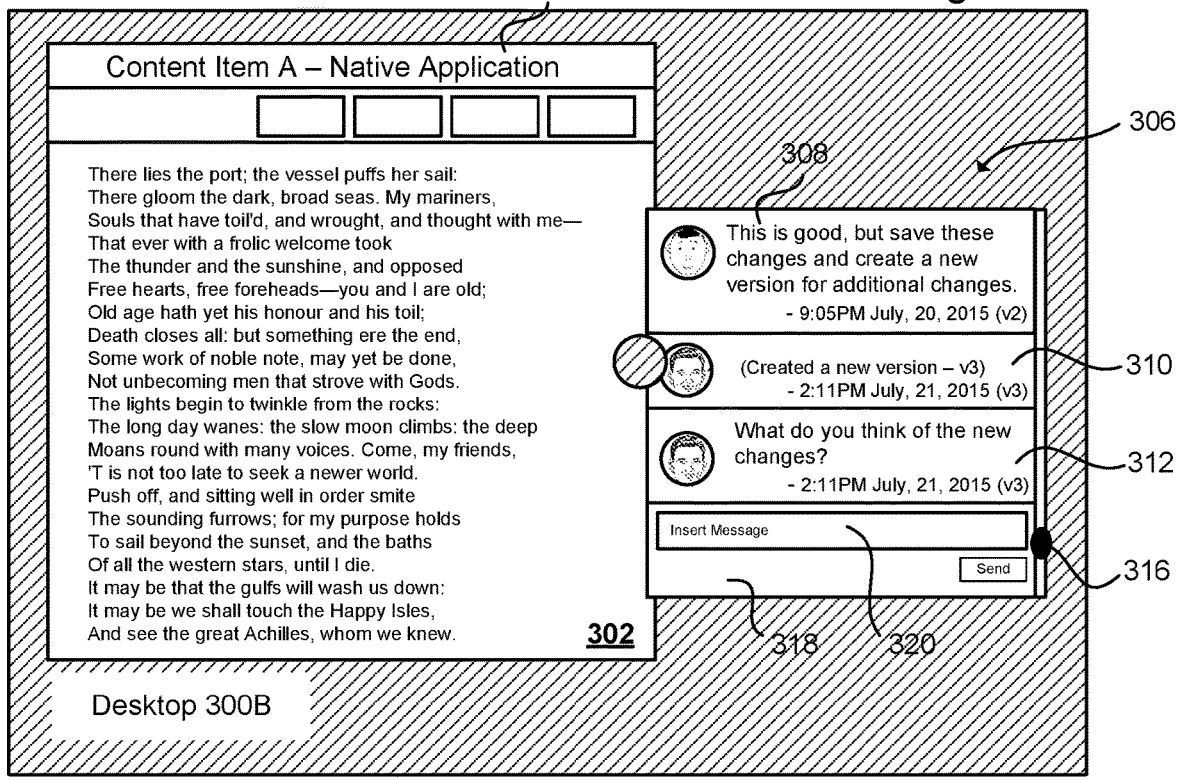

Referring now to FIGS. 3-5 there is shown an example of the collaborative editing that includes multiple users making changes to and comments (i.e., messages via an activity feed) on content item 302. FIGS. 3A and 3B show content item 302 displayed on desktop 300A to a first user (clear background) while content item 302 is also displayed on desktop 300B to a second user (striped background). In this example, content item 302 may be displayed simultaneously on desktop 300A and 300B where the collaboration is in substantially real time (synchronous collaboration), or the corresponding interactions by the different users captured in these figures may occur at different times (asynchronous collaboration). In this example, content item 302 is a word processing document and is displayed in FIGS. 3A and 3B by native application 255 such as a word processor, on both desktop 300A and 300B, Additionally, content item 302 is displayed concurrently with activity feed 306 on both desktops 300A and 300B, thereby providing a currently updated-list or history of content item events and user submitted messages, reflecting events that are specific to the content item 302 in essentially real time as they occur on any device that has access to the content item 302. In this example, activity feed 306 includes messages 308 and 312, event notification 310, interaction icon 314 for selectively displaying activity feed 306, and chat or message interface 318 that includes text field 320 for receiving messages from users. Starting from the top, activity feed 306 includes message 308 from a first user providing an instruction to a second user to make a change to content item 302, event notification 310 shows that the second user has performed the instruction from the first user by creating a new version of content item 302, and message 312 which is a question from the second user to the first user about changes made to content item 302.

As shown in FIGS. 3-5, the messages and event notifications display content associated with the message or event notification (e.g., text of the message or notification) and information for the user who submitted the message or event notification based on user account (e.g., user name, user icon), when the message or event notification was submitted by the user (e.g., the timestamps in 308, 310, 312), and the version of content item 302 corresponding to the message or event notification (e.g., (v2) in 308, (v3) in 310, and (v3) in 312). Additionally, as shown in FIGS. 3A and 3B, messages and event notifications corresponding to previous versions of content item 302 are simultaneously displayed with those of the current version. For example, message 308 corresponds to version 2 of content item 302 and instructs the second user to create a new version. In response, the second user creates a new version and this event is reflected in event notification 310 that includes an indication for the new version (v3). The messages and event notifications for previous versions of content item 302 can be viewed by scrolling up activity feed 306 using scroll button 316. The concurrent display of notifications and messages associated with different versions of a content item provides the user with a more complete view of the overall history and development of the content item.

Figure 4A:
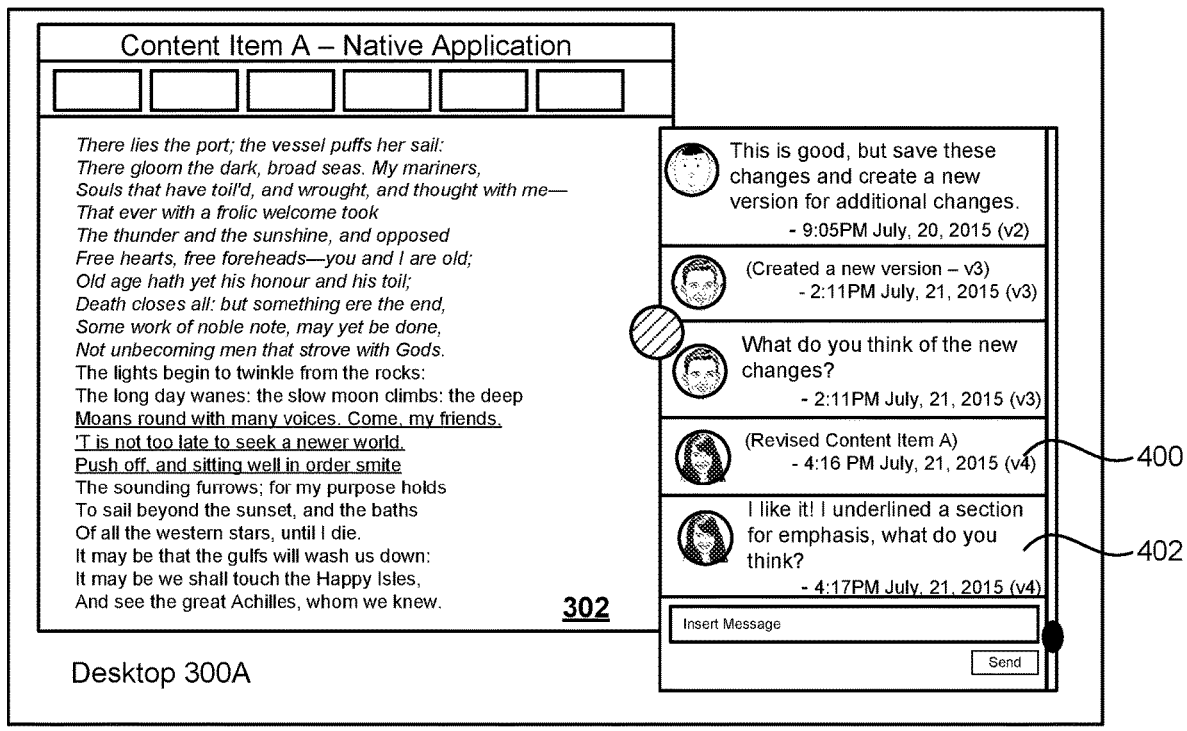
FIGS. 4A and 4B show event information reflected in the activity feed provided by the second user in response to the interaction of the first user shown in FIGS. 3A and 3B.
Figure 4B:
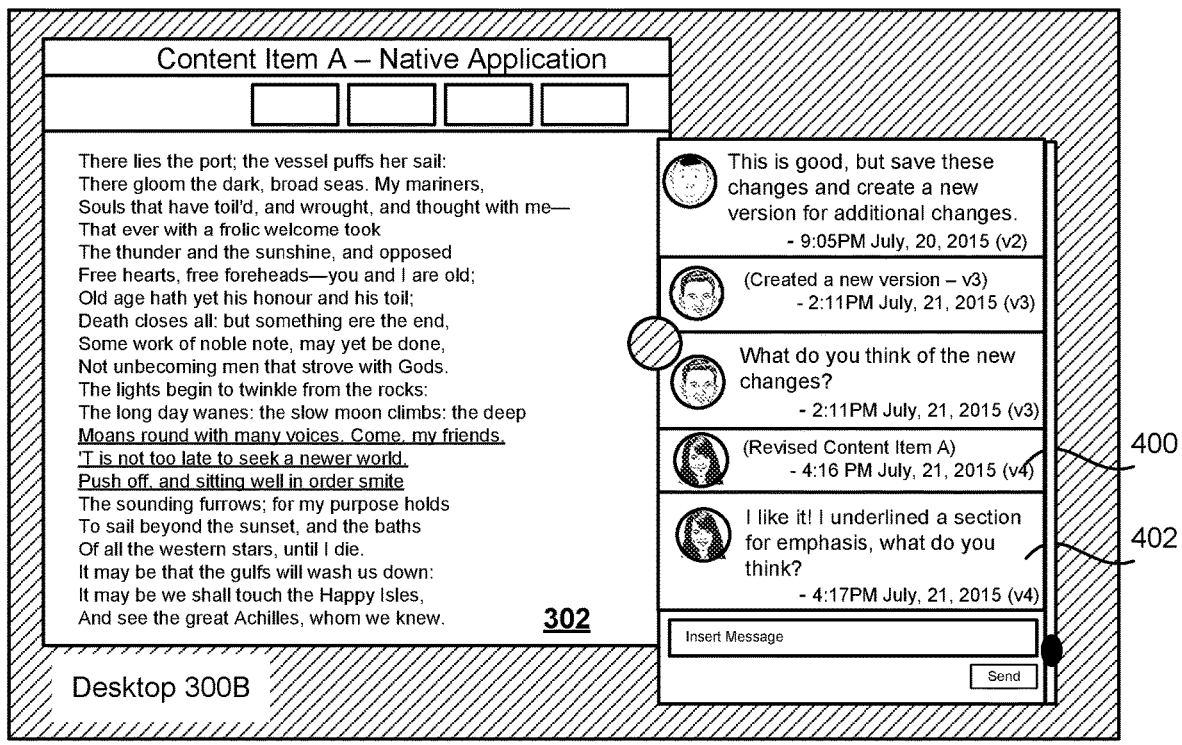

Similarly, FIGS. 4A and 4B show content item 302 displayed on desktop 300A to the first user and on desktop 300B to the second user reflecting changes made by a third user. In this example, the third user has made a revision to content item 302 (i.e., a change to the content data) by underlining a portion of text in content item 302 and this revision is synchronized across all shared devices 100, and shown displayed on desktops 300A and 300B. Upon receiving the changes to content item 302 corresponding to the revision, content management system 110 creates a new version (v4) for content item 302 and provides event data corresponding to the creation of the new version to shared device 100. In this example, the event data for the new version is displayed in activity feed 306 as a revision in event notification 400. Additionally, after making the revision and causing a new version to be created, the third user submits message 402 giving an opinion on prior changes made by the second user and notifying the other users of the changes made to content item 302 (i.e., the underlining added to the text). Accordingly, since the third user submitted message 402 after the creation of the new version (v4), message 402 is associated with the new version (v4).

FIG. 5 shows content item 302 displayed on desktop 300C to a fourth user in a web preview of content item 302 as displayed by web browser 250. In this example, the device of desktop 300C displaying content item 302 does not include client application 200. Thus, the fourth user has logged into their user account with content management system 110 though a webpage to access their content items. In order to view a content item in a web preview, content management system 110 accesses the content item, converts the content item from the format of its native application to a preview format, such as PDF, and renders the content item for display in a web browser. In this case, a user can view the content items as web previews or download a content item for local editing or viewing, however, changes made to a content item that is downloaded from the web cannot be synchronized with content management system 110. The web preview, thus, enables the fourth user to view revisions to a content item 302 made by other users and updates to activity feed 306 in substantially real time or upon refreshing the browser, for example.

Activity feed 306 for a web preview, however, still includes message interface 318 and text field 320 to submit messages. Accordingly, in this example, activity feed 306 is displaying event notification 502 corresponding to the fourth user viewing content item 302. The fourth user is unable to make their desired changes; however, they can submit a message to the other users for changes they would like to have made or see made to content item 302. Thus, in this example, the fourth user submits message 504 commenting on the margins of content item 302.

Additionally, FIG. 5 shows activity feed 306 displaying event notification 502 corresponding to the fourth user viewing content item 302 at 6:19 PM. In one embodiment, event notifications for user views may be displayed to other users in activity feed 306 each time a user opens content item 302 in addition to a respective user submitting a comment or making changes to content item 302. Alternatively, an event notification for a user view may only be provided when the user views content item 302 and does not trigger any other type of event (e.g., does not revise, create a new version, submit a message, etc.). In this example, event notification 502 indicates that the fourth user viewed content item at 6:19 PM and then submitted message 504 at 6:35 PM.

FIG. 6 shows an interaction diagram for providing activity feed 306 for display in response to receiving a request from device 100 to display content item 302. In this example, a native application 255 sends a request to launch content item 302 from a file folder. The request is received 602 by access module 206 of client application 200. Access module 206 provides event management module 204 with event data for events, such as when a user opens, closes, revises, or edits the content item and when a user renames or creates a new version of the content item, and is one means for performing this function. Thus, in response to receiving the request, access module sends 604 event data corresponding to the open content item request with a content item ID for content item 302 to event management module 204.

Accordingly, event management module 204 sends 606 an update request for the content data and cumulative event data (i.e., data for all past versions, views, messages, etc.) stored with content management 110 using the content ID, and user account ID to determine whether the content data and cumulative event data stored locally in local content data store 208 and event data store 210, respectively, are current (i.e., no changes have been made on other devices). If there are no updates or synchronization data available, event management module 204 receives a notification indicating that there are no updates or synchronization data available for the content data and cumulative event data for content item 302. If the content data or cumulative event data are not current (i.e., there is an update or synchronization data available for content item 302), event management module 204 receives 608 a content data update and an event data update, thereby, synchronizing content item 302 and/or its associated event data with the version of content item 302 stored with content management system 110.

In response to receiving the content and event data update, event management module 204 sends 610 the updated content data and updated event data with the content item ID for content item 302 to local content data store 208 and/or event data store 210. Accordingly, upon receiving the content and event data update, local content data store 208 and/or event data store 210 update 612 the content and event data stored locally. Additionally, event data for the received content item request of 602 is stored 612 as a content item "open" event in event data store 210. Once updated locally, the content data is sent to native application 255 and the cumulative event data is sent 614 to activity feed module 207 for display. Accordingly, content item 302 is displayed by native application 255 and the content item events corresponding to the cumulative event data are displayed 616 by activity feed module 207 as event notifications in activity feed 306.

Figure 7A:
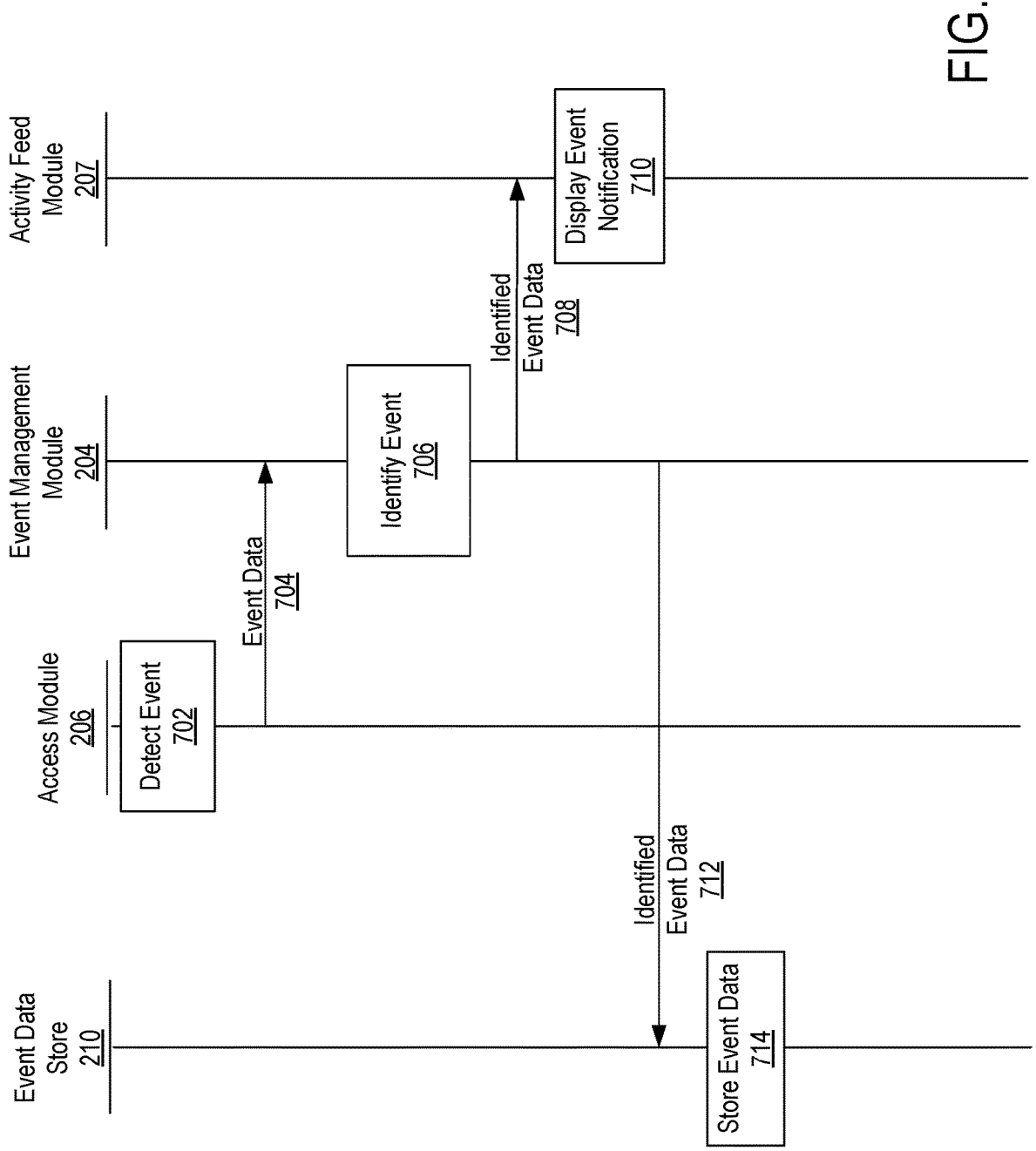
FIG. 7A shows an interaction diagram for generating event data on a client device, according to one embodiment.

In one embodiment, event data corresponding to changes to the content data of a content item is generated on content management system 110 and event data for events that do not change the content data of the content item are generated on client 100. FIG. 7A shows an interaction diagram for generating event data corresponding to a view, a message, or a comment on client 100. In this example, an event originating on client device 100 is detected 702 by access module 206. In this example, access module 206 identifies the event first by what content item the event belongs to (using the content item ID associated with the event data), then by version of the content item the event was made to, and then by event type (e.g., a view, a message, or comment, etc.). Accordingly, access module 206 then generates and sends 704 event data for the event to event management module 204. Event management module 204 identifies 706 the event type and sends 708 the identified event data to activity feed module 207 for display. Upon receiving the identified event data, activity feed module 207 displays 710 the event data in activity feed 306. Additionally, event management module 204 sends (not shown) the event data to content management system 110 for synchronization with other devices 100. Locally, event management module 204 sends 712 the event data to event data store 210 where event data store 210 stores 714 the event data. Event data generated on content management system 110 is similarly received by device 100, as discussed above.

FIG. 7B shows an interaction diagram for receiving event data generated by content management system 110. In one example, a new version of the content items is created each time changes to a content item are saved to content management system 110 and event data for the new version is generated on content management system 110 in response. Accordingly, in this example, changes are made to a content item on device 100. Access module 206 detects 716 the changes when the content item is saved. Access module 206 sends change data 718 corresponding to the changes made to the content item to event management module 204. Event management module 204 sends change data 718 to content management system 110 and provides change data 718 locally to local content data store 208. Local content data store 208 stores the changes to a local copy of the content item on device 100.

Content management system 110 receives change data 718 and stores 720 the changes to a copy of the content item stored with content management system 110. In one example, content management system 110 may store the content item with the changes as a new version of the content item and, in response to generating the new version; content management system 110 generates 724 event data 728. The event data 728 includes the various events associated with the content item (including any messages, comments, and so forth). The event data 728 is stored separately from the content data of the content item. Content management system 110 sends the new version and event data 728 to each device 100 for synchronization 726. Accordingly, event data 728 for the new version is sent to device 100 and received by event management module 204. As similarly discussed above, event management module 204 identifies 730 the event type and sends identified event data 732 to activity feed module 207 for display as an event notification 736 and to event data store 210 for storage 734.

Alternatively, event management module 204 receives change data 718 from access module 206 and does not subsequently provide change data 718 to local content data store 208 for storage. Instead, the content item is updated on device 100 when content management system 100 sends the new version and event data 728 to each device 100 for synchronization 726.

Figure 8:
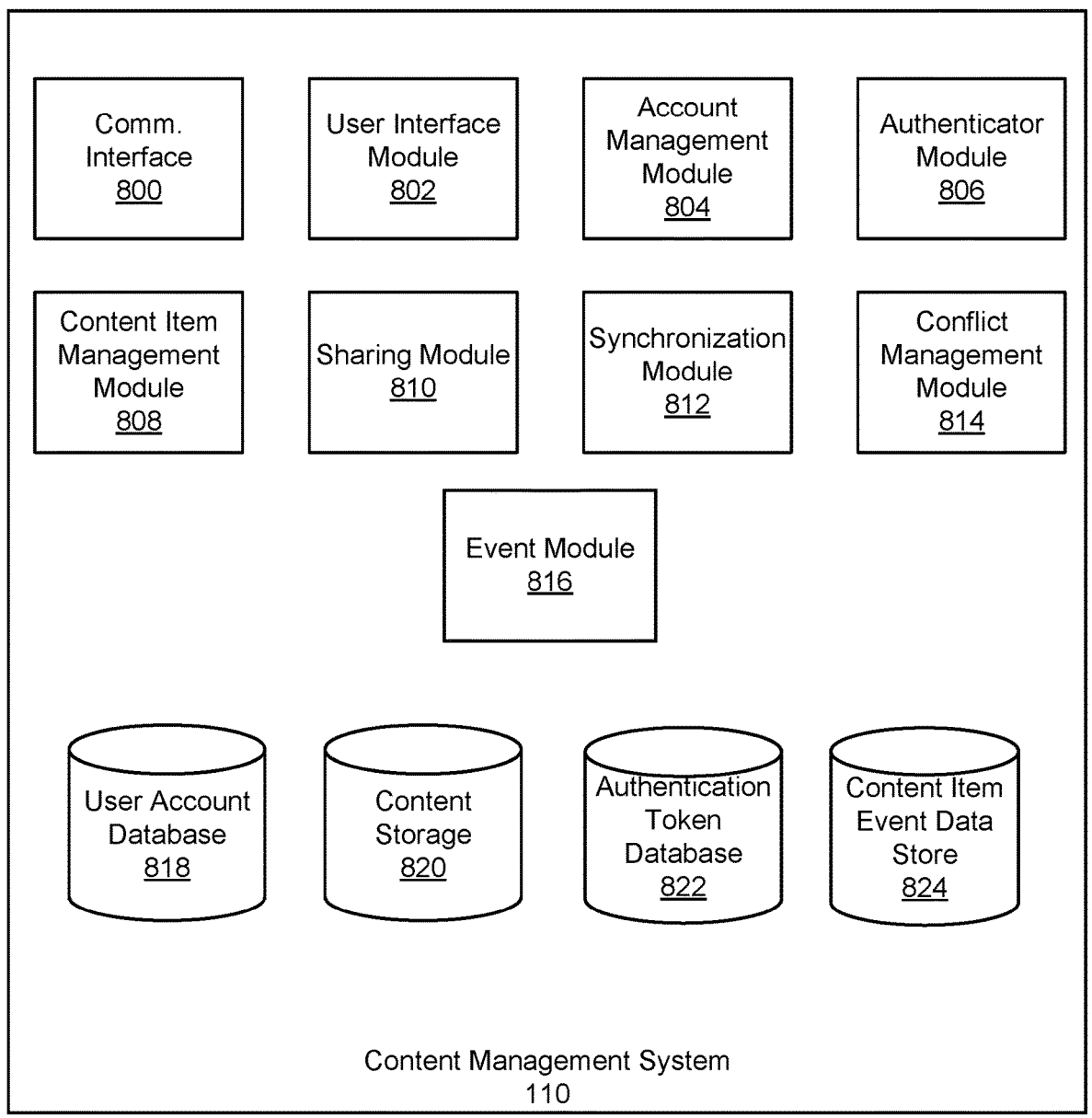
FIG. 8 shows components of a content management system, according to one embodiment.

FIG. 8 shows components of content management system 110 of FIG. 1, according to one embodiment. In one configuration, components described below with reference to content management system 110 are incorporated into devices 100 that share and synchronize content items without management by content management system 110. These devices 100 may synchronize content and share interaction information over network 120 or via a direct connection as described above. In this configuration, devices 100 may incorporate functionality of synchronization module 812, conflict management module 814, Event synchronization module 816, and other modules and data stores for incorporating functionality described below as provided by content management system 110. Accordingly, devices 100 in this configuration operate in a peer-to-peer configuration and may do so without content management system 110 or network 120.

When using content management system 110, to facilitate the various content management services, a user can create an account with content management system 110. The account information can be maintained in user account database 818, and is one means for performing this function. User account database 818 can store profile information for registered users. In some cases, the only personal information in the user profile can be a username and/or email address. However, content management system 110 can also be configured to accept additional user information, such as password recovery information, demographics information, payment information, and other details. Each user is associated with an identifier, such as a user ID or a user name.

User account database 818 can also include account management information, such as account type, e.g., free or paid; usage information for each user, e.g., file edit history; maximum storage space authorized; storage space used; content storage locations; security settings; personal configuration settings; content sharing data; etc. Account management module 804 can be configured to update and/or obtain user account details in user account database 818. Account management module 804 can be configured to interact with any number of other modules in content management system 110.

An account can be associated with multiple devices 100, and content items can be stored in association with an account. The stored content can also include folders of various types with different behaviors, or other content item grouping methods. For example, an account can include a public folder that is accessible to any user. The public folder can be assigned a web-accessible address. A link to the web-accessible address can be used to access the contents of the public folder. In another example, an account can include a photo folder that is intended for photo content items and that provides specific attributes and actions tailored for photos; an audio folder that provides the ability to play back audio file content items and perform other audio related actions; or other special purpose folders. An account can also include shared folders or group folders that are linked with and available to multiple user accounts. The permissions for multiple users may be different for a shared folder. In one embodiment, the account is a namespace that may be associated with several users, each of whom may be associated with permissions to interact with the namespace.

The content can be stored in content storage 820, which is one means for performing this function. Content storage 820 can be a storage device, multiple storage devices, or a server. Alternatively, content storage 820 can be a cloud storage provider or network storage accessible via one or more communications networks. In one configuration, content management system 110 stores the content items in the same organizational structure as they appear on the device. However, content management system 110 can store the content items in its own order, arrangement, or hierarchy.

Content storage 820 can also store metadata describing content items, content item types, and the relationship of content items to various accounts, folders, or groups. The metadata for a content item can be stored as part of the content item or can be stored separately. In one configuration, each content item stored in content storage 820 can be assigned a system-wide unique identifier.

Content storage 820 can decrease the amount of storage space required by identifying duplicate content items or duplicate segments of content items. In one embodiment, for example, a content item may be shared among different users by including identifiers of the users within ownership metadata of the content item (e.g., an ownership list), while storing only a single copy of the content item and using pointers or other mechanisms to link duplicates with the single copy. Similarly, content storage 820 stores content items using a version control mechanism that tracks changes to content items, different versions of content items (such as a diverging version tree), and a change history. The change history includes a set of changes that, when applied to the original content item version, produces the changed content item version.

Content management system 110 automatically synchronizes content items from one or more devices, using synchronization module 812, which is one means for performing this function. The synchronization is platform-agnostic. That is, the content items are synchronized across multiple devices 100 of varying type, capabilities, operating systems, etc. For example, client application 200 synchronizes, via synchronization module 812 at content management system 110, content in the file system of device 100 with the content items in an associated user account on system 110. Client application 200 synchronizes any changes to content items in a designated folder and its sub-folders with the synchronization module 812. Such changes include new, deleted, modified, copied, or moved files or folders. Synchronization module 812 also provides any changes to content associated with device 100 to client application 200. This synchronizes the local content at device 100 with the content items at content management system 110.

Conflict management module 814 determines whether there are any discrepancies between versions of a content item located at different devices 100. For example, when a content item is modified at one device and a second device, differing versions of the content item may exist at each device. Synchronization module 812 determines such versioning conflicts, for example by identifying the modification time of the content item modifications. Conflict management module 814 resolves the conflict between versions by any suitable means, such as by merging the versions, or by notifying the device of the later-submitted version.

A user can also view or manipulate content via a web interface generated by user interface module 802. For example, the user can navigate in web browser 250 to a web address provided by content management system 110. Changes or updates to content in content storage 620 made through the web interface, such as uploading a new version of a file, are synchronized back to other devices 100 associated with the user's account. Multiple devices 100 may be associated with a single account and files in the account are synchronized between each of the multiple devices 100.

Content management system 110 includes communications interface 800 for interfacing with various devices 100, and with other content and/or service providers via an Application Programming Interface (API), which is one means for performing this function. Certain software applications access content storage 820 via an API on behalf of a user. For example, a software package, such as an app on a smartphone or tablet computing device, can programmatically make calls directly to content management system 110, when a user provides credentials, to read, write, create, delete, share, or otherwise manipulate content. Similarly, the API can allow users to access all or part of content storage 820 through a web site.

Content management system 110 can also include authenticator module 806, which verifies user credentials, security tokens, API calls, specific devices, etc., to determine whether access to requested content items is authorized, and is one means for performing this function. Authenticator module 806 can generate one-time use authentication tokens for a user account. Authenticator module 806 assigns an expiration period or date to each authentication token. In addition to sending the authentication tokens to requesting devices, authenticator module 806 can store generated authentication tokens in authentication token database 822. Upon receiving a request to validate an authentication token, authenticator module 806 checks authentication token database 822 for a matching authentication token assigned to the user. Once the authenticator module 806 identifies a matching authentication token, authenticator module 806 determines if the matching authentication token is still valid. For example, authenticator module 806 verifies that the authentication token has not expired or was not marked as used or invalid. After validating an authentication token, authenticator module 806 may invalidate the matching authentication token, such as a single-use token. For example, authenticator module 806 can mark the matching authentication token as used or invalid, or delete the matching authentication token from authentication token database 822.

Content management system 110 includes a sharing module 810 for sharing content publicly or privately. Sharing content publicly can include making the content item accessible from any computing device in network communication with content management system 110. Sharing content privately can include linking a content item in content storage 820 with two or more user accounts so that each user account has access to the content item. The content can also be shared across varying types of user accounts.

In some embodiments, content management system 110 includes content management module 808 for maintaining a content directory that identifies the location of each content item in content storage 820, and allows client applications to request access to content items in the storage 820, and which is one means for performing this function. A content entry in the content directory can also include a content pointer that identifies the location of the content item in content storage 820. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes a user account identifier that identifies the user account that has access to the content item. In some embodiments, multiple user account identifiers can be associated with a single content entry indicating that the content item has shared access by the multiple user accounts.

To share a content item privately, sharing module 810 adds a user account identifier to the content entry associated with the content item, thus granting the added user account access to the content item. Sharing module 810 can also be configured to remove user account identifiers from a content entry to restrict a user account's access to the content item.

To share content publicly, sharing module 810 generates a custom network address, such as a URL, which allows any web browser to access the content in content management system 110 without any authentication. The sharing module 810 includes content identification data in the generated URL, which can later be used by content management system 110 to properly identify and return the requested content item. For example, sharing module 810 can be configured to include the user account identifier and the content path in the generated URL. The content identification data included in the URL can be transmitted to content management system 110 by a device to access the content item. In addition to generating the URL, sharing module 810 can also be configured to record that a URL to the content item has been created. In some embodiments, the content entry associated with a content item can include a URL flag indicating whether a URL to the content item has been created.

Event module 816 manages the event data for content management system to enable synchronization module 812 to provide the event data for display as messages and as event notifications across devices 100. For example, event module 816 generates event data in response to the creation of a new version and provides the event data to synchronization module 812. Additionally, event module 816 receives the event data corresponding to user views, messages, comments, and so forth from event management module 204 of client application 200 on devices 100. Event module 816 subsequently stores the event data as part of an event record or content event log in content item event data store 824 of content management system 110. Accordingly, the version data, user message data, view data, and so forth are eventually stored in content item event data store 824.

FIG. 9 shows the data schema within content item event data store 824 for content event log 900. Content event log contains a plurality of event entries. In one embodiment, each event entry of content event log 900 includes data for an event ID 902, a content item ID 904 ("<contentID>"), a version ID 906, a timestamp 908, a user ID 910, and event text 912. In this example, event ID 902 is an identifier that may uniquely identify an event, connect the event to a content item, and describe the event type. In this example, event ID 902 include a letter and a number where the letter corresponds to the event type (i.e., new version, comment, message, view, etc.) and the number corresponds to a count for a particular version of a content item of that event type. In another example, the event may include an event type ID that is separate from event ID 902.

Content item ID 904 is unique identifier that associates an event with a particular content item. This enables content management system 110 to search content event log 900 and locate all events associated with a particular content item. Version ID 906 represents the version of content item 904 that was current at the time a particular event was triggered. Timestamp 908 is an identifier corresponding to when the event occurred and user ID 910 corresponds to a user account associated with the generation of event. Additionally, content event log 900 includes event text 912 for text of a comment or message event. Content item event log is shown for illustrative purposes and it will be appreciated that other data and/or different representations of the data shown in content event log 900 can be provided in practice within the scope of various embodiments discussed herein.

Figure 10A:
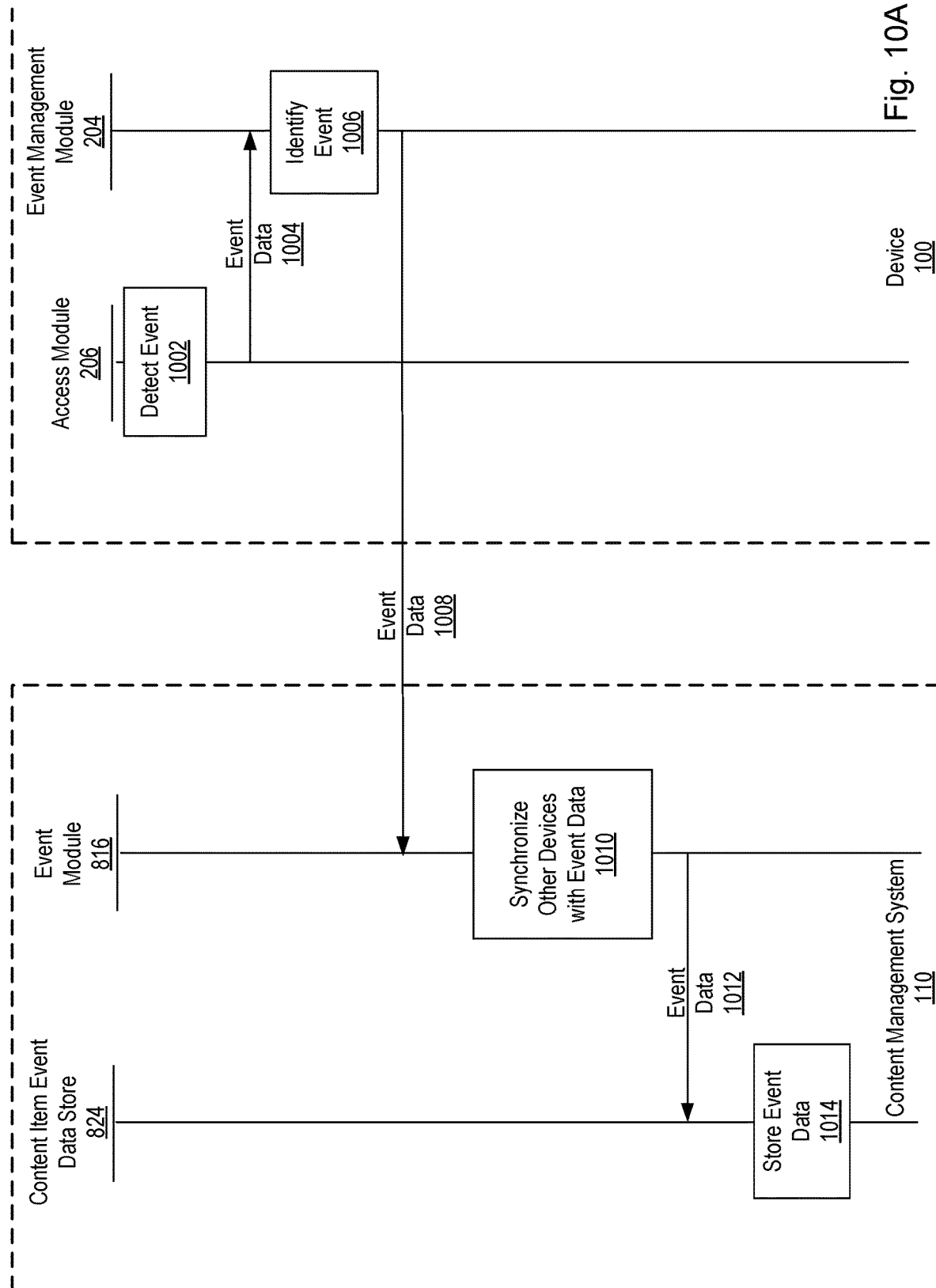
FIG. 10A shows an interaction diagram for generating event on a client device, according to one embodiment.

Accordingly, FIG. 10A shows an interaction diagram for generating event data corresponding to a view, a message, or a comment on device 100 and sending the event data to content management system 110. As similarly described above with respect to FIG. 7A, access module 206 of device 100 detects 1002 an event, sends 1004 the event data for the event to event management module 204. Event management module 204 identifies 1006 the event and causes 1008 the event data to be sent through a network to event module 816 of content management system 110.

Event module 816 of content management system 110 receives the event data for the event that occurred on device 100 and synchronizes 1008 other devices associated with sharing content item 302 (e.g., by metadata of content item 302 indicating other user accounts and devices associated with those user accounts). Either simultaneously, before, or after synchronizing the other devices with the event data, event synchronization module 816 sends 1010 the event data to content item event data store 824 of content management system 110 and content item event data store 824 stores 1012 the event data.

Figure 10B:
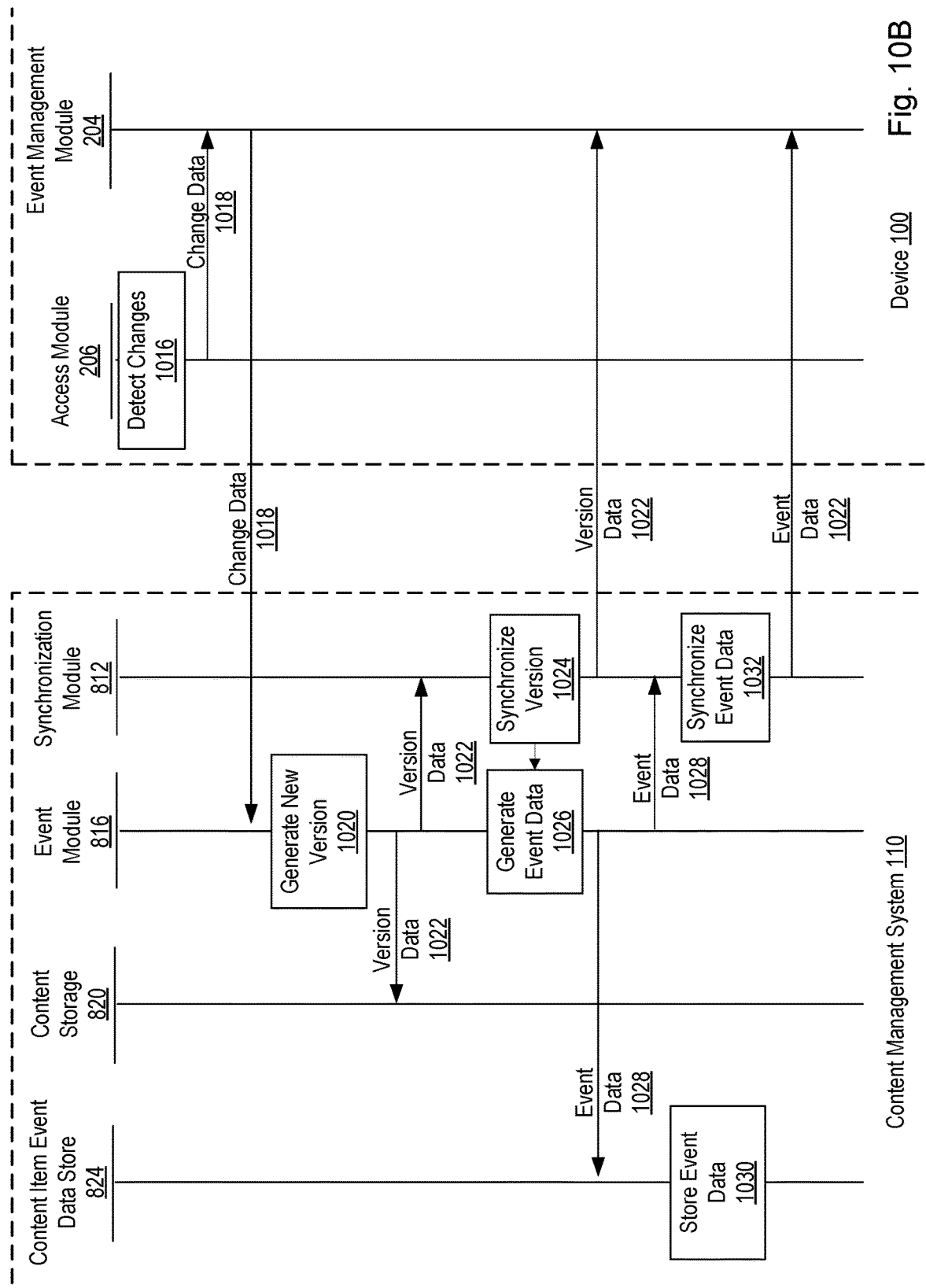
FIG. 10B shows an interaction diagram for generating a new version of a content item and event data for the new version, according to one embodiment.

FIG. 10B shows an interaction diagram for generating a new version of a content item and event data for the new version in response to receiving changes to the content item. In this example, changes are made to a content item on device 100. Access module 206 detects 1016 the changes when the content item is saved. Access module 206 sends change data 1018 corresponding to the changes made to the content item to event management module 204. Event management module 204 sends change data 1018 to event module 816 of content management system 110. In response to receiving change data 1018, event module 816 generates 1020 a new version of the content item, sends version data 1022 for the new version to content storage 820 for storing the new version on content management 110, and provides version data 1022 to synchronization module 812. Accordingly, synchronization module 812 subsequently sends version data 1022 to each client device 100 where it is initially received by event management module 204, which will coordinate its eventual storage in local content data store 208.

Additionally, event module 816 generates event data 1026 corresponding to the generation 1020 of the new version of the content item. Accordingly, event module 816 sends event data 1028 for the new version event to content item event data store 824 for storage 1030 with content management system 110, and sends event data 1028 to synchronization module 812. Synchronization module 812 subsequently sends event data 1028 to each client device 100 where event data 1028 is received by event management module 204 and eventually sent to event data store 210 for storage on device 100 and to activity feed module 207 to be displayed as an event notification in an activity feed.

Figure 11:
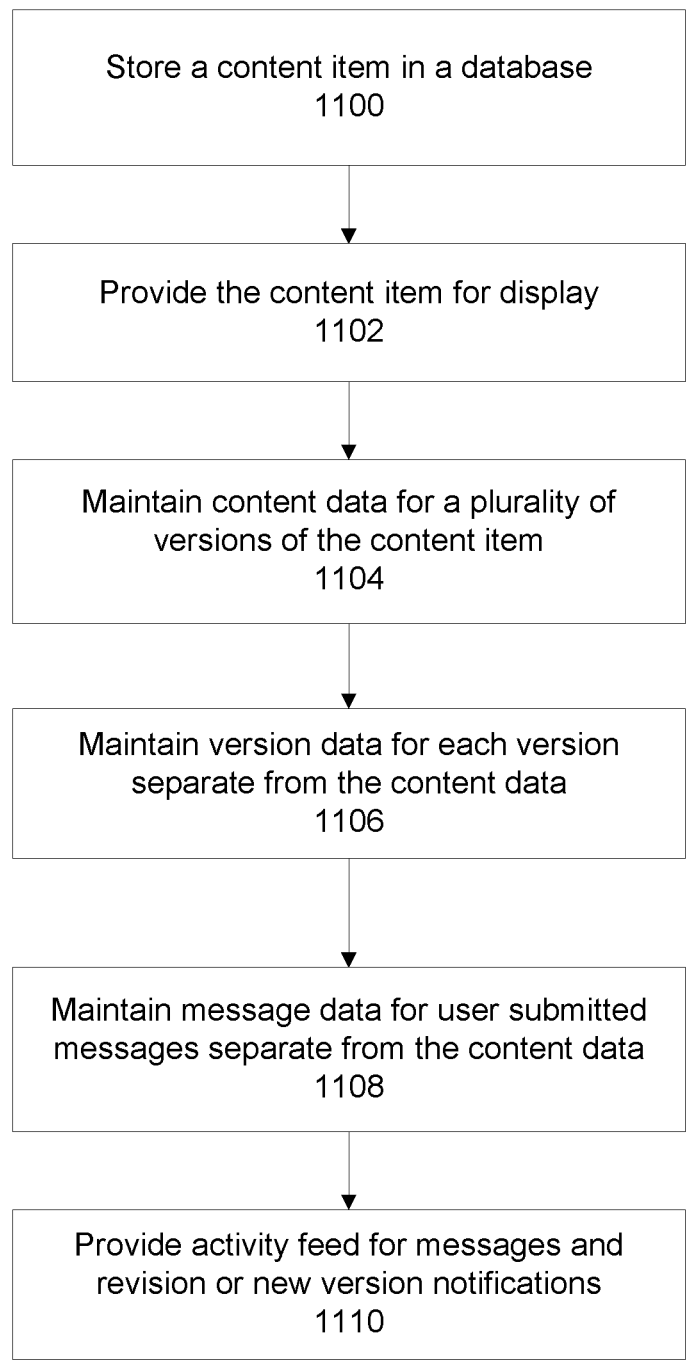
FIG. 11 shows an example process for providing event information for display to users of a shared content item, according to one embodiment.

FIG. 11 shows an example process for providing event information for display to users of a shared content item. Content management system 110 stores 1100 content data for content item 302 in content storage 820 that can be retrieved by users authorized to access content item 302. For example, a first user creates content item 302 via native application 255 on device 100 and saves content item 302 to their account with content management system 110. In this example, the first user shares content item 302 with multiple other users. In order to share content item 302, content management system 110 may send a share link created by the first user that invites the other users to view and edit content item 302. In order to grant other users access to content item 302, content management system 110 associates metadata with content item 302 indicating that the invited users can now save content item 302 with their user account and have content item 302 synchronized across all users via synchronization module 812 and event synchronization module 816. Accordingly, content management system 110 provides 1002 shared content item 302 for display to each user.

In order to facilitate the various features herein, content management system 110 maintains 1104 content data of content item 302 for multiple versions. Additionally, content management system 110 may also maintain 1106 version event data corresponding to each version of content item 302 separate in content item event data store 824 from the content data stored in content storage 820. In this example, the version event data may correspond to information associated with the creation of a particular version, such as the user ID of the user who created a respective version, when the version was created, on what device was a respective version created, and so forth.

Further, content management system 110 maintains 1108 user message data in content item event data store 824 corresponding to the one or more messages associated with content item 302 for each version. As above, the user message data may be maintained separate in content item event data store 824 from the content data of content item 302 stored in content storage 820 and information associated with the creation of a particular message, such as the user ID of the user submitting a respective message, when the message was submitted, on what device a respective message was submitted, and so forth. In one example, the messages are associated with a version of content item 302 that was displayed when a respective message was submitted. Thus, the message refers to a version of content item 302 that existed at the time the message was created.

Finally, content management system 110 provides 1110 activity feed 306 for display with content item 302 to the users. Activity feed 306, though provided for display with content item 302, is separate from the content data of content item 302 and native application 255 associated with content item 302. Activity feed 306 displays the comments and event notifications associated with the maintained version data, and user comment data and will display the comments and event notifications for future comments, changes or revisions, and new versions. In one example, content item 302 is displayed by native application 255 and activity feed 306 is provided by content management system 110 in a layer separate from native application 255.

In another example, content management system 110 maintains view data in content item event data store 824 corresponding to when users open and view content item 302 and provides information corresponding to the view data for display as event notifications. As with the revision data, version data, and user message data, the view data is maintained separate from the content data of content item 302.

Content management system 110 may be implemented using a single computer, or a network of computers, including cloud-based computer implementations. For the purposes of this disclosure, a computer is device having one or more processors, memory, storage devices, and networking resources. The computers are preferably server class computers including one or more high-performance CPUs and 1 G or more of main memory, as well as 500 Gb to 2 Tb of computer readable, persistent storage, and running an operating system such as LINUX or variants thereof. The operations of content management system 110 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, failover servers, network management tools and so forth are not shown so as not to obscure the features of the system. Finally, the functions and operations of content management system 110 are sufficiently complex as to require implementation on a computer system, and cannot be performed in the human mind simply by mental steps.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented by a combination of hardware and software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
providing, by a content management system, a content item for display to a first computing device in a first native application of the content item and to a second computing device in a second native application of the content item;
receiving, by the content management system, an indication of updates to the content item on the first computing device, the indication received from a first client application on the first computing device, the indication comprising update information received by the first client application from the first native application operating separately from the first client application; and
providing, by the content management system, the received update information to a second client application of the second computing device, the second client application configured to represent the received update information in an activity feed displayed on the second computing device in visual coordination with the second native application displaying the content item.

2. The method of claim 1, further comprising:
receiving, from the second computing device, a request to access the content item using a web browser on the second computing device;
converting the content item from a native file format into a preview of a native file, the preview displaying the content item in a file format other than the native file format associated with the native application; and
providing the preview to the second computing device for display.

3. The method of claim 1, further comprising:
generating event data, the event data comprising a content item ID associating the content item with the updates to the content item; and
providing the event data to the second computing device, wherein the received update information is displayed in the activity feed based on the content item ID.

4. The method of claim 1, further comprising:
receiving, from the first computing device, a change to the content data of the content item, the change corresponding to the first computing device saving changes made to the content data of the content item;
storing the change to the content data of the content item as a new version; and
providing a notification corresponding to the new version in the activity feed.

5. The method of claim 1, further comprising:
associating the content item with access data indicating that the first computing device and the second computing device have access to the content item;
maintaining view data corresponding to the first computing device or the second computing device opening and viewing the content item; and providing information corresponding to the view data for inclusion with the one or more messages to be displayed as the one or more notifications in the activity feed.

6. The method of claim 1, further comprising:
maintaining, by the content management system, a plurality of versions of the content item and version data associated with creation of each of the plurality of versions, wherein each version of the plurality of versions of the content item includes a timestamp and a user identifier, and wherein notifications displayed in the activity feed include the timestamp and the user identifier of a computing device that created the version.

7. The method of claim 6, further comprising:
maintaining, for each version of the content item, user message data corresponding to one or more messages associated with the content item submitted by the first computing device or the second computing device, wherein each of the one or more messages is associated with a respective version of the plurality of versions of the content item that was displayed when the message was submitted; and
responsive to receiving a message submitted to the activity feed by the first computing device, providing the message to be displayed as the one or more notifications in the activity feed.

8. A non-transitory computer readable storage medium storing executable instructions that, when executed by one or more processors, cause the one or more processors to perform operations comprising:
providing a content item for display to a first computing device in a first native application of the content item and to a second computing device in a second native application of the content item;
receiving an indication of updates to the content item on the first computing device, the indication received from a first client application on the first computing device, the indication comprising update information received by the first client application from the first native application operating separately from the first client application; and
providing the received update information to a second client application of the second computing device, the second client application configured to represent the received update information in an activity feed displayed on the second computing device in visual coordination with the second native application displaying the content item.

9. The non-transitory computer readable storage medium of claim 8, wherein the operations further comprise:
receiving, from the second computing device, a request to access the content item using a web browser on the second computing device;
converting the content item from a native file format into a preview of a native file, the preview displaying the content item in a file format other than the native file format associated with the native application; and
providing the preview to the second computing device for display.

10. The non-transitory computer readable storage medium of claim 8, wherein the operations further comprise:
generating event data, the event data comprising a content item ID associating the content item with the updates to the content item; and
providing the event data to the second computing device, wherein the received update information is displayed in the activity feed based on the content item ID.

11. The non-transitory computer readable storage medium of claim 8, wherein the operations further comprise:
receiving, from the first computing device, a change to the content data of the content item, the change corresponding to the first computing device saving changes made to the content data of the content item;
storing the change to the content data of the content item as a new version; and
providing a notification corresponding to the new version in the activity feed.

12. The non-transitory computer readable storage medium of claim 8, wherein the operations further comprise:
associating the content item with access data indicating that the first computing device and the second computing device have access to the content item;
maintaining view data corresponding to the first computing device or the second computing device opening and viewing the content item; and
providing information corresponding to the view data for inclusion with the one or more messages to be displayed as the one or more notifications in the activity feed.

13. The non-transitory computer readable storage medium of claim 8, wherein the operations further comprise:
maintaining a plurality of versions of the content item and version data associated with creation of each of the plurality of versions, wherein each version of the plurality of versions of the content item includes a timestamp and a user identifier, and wherein notifications displayed in the activity feed include the timestamp and the user identifier of a computing device that created the version.

14. The non-transitory computer readable storage medium of claim 13, wherein the operations further comprise:
maintaining, for each version of the content item, user message data corresponding to one or more messages associated with the content item submitted by the first computing device or the second computing device, wherein each of the one or more messages is associated with a respective version of the plurality of versions of the content item that was displayed when the message was submitted; and
responsive to receiving a message submitted to the activity feed by the first computing device, providing the message to be displayed as the one or more notifications in the activity feed.

15. A system comprising:
one or more processors; and
a non-transitory computer-readable storage medium storing instructions that, when executed by the one or more processors, cause the system to perform operations comprising:
providing a content item for display to a first computing device in a first native application of the content item and to a second computing device in a second native application of the content item;
receiving an indication of updates to the content item on the first computing device, the indication received from a first client application on the first computing device, the indication comprising update information received by the first client application from the first native application operating separately from the first client application; and providing the received update information to a second client application of the second computing device, the second client application configured to represent the received update information in an activity feed displayed on the second computing device in visual coordination with the second native application displaying the content item.

16. The system of claim 15, wherein the operations further comprise:

receiving, from the second computing device, a request to access the content item using a web browser on the second computing device;

converting the content item from a native file format into a preview of a native file, the preview displaying the content item in a file format other than the native file format associated with the native application; and providing the preview to the second computing device for display.

17. The system of claim 15, wherein the operations further comprise:

generating event data, the event data comprising a content item ID associating the content item with the updates to the content item; and providing the event data to the second computing device, wherein the received update information is displayed in the activity feed based on the content item ID.

18. The system of claim 15, wherein the operations further comprise:

receiving, from the first computing device, a change to the content data of the content item, the change corresponding to the first computing device saving changes made to the content data of the content item;

storing the change to the content data of the content item as a new version; and providing a notification corresponding to the new version in the activity feed.

19. The system of claim 15, wherein the operations further comprise:

associating the content item with access data indicating that the first computing device and the second computing device have access to the content item;

maintaining view data corresponding to the first computing device or the second computing device opening and viewing the content item; and providing information corresponding to the view data for inclusion with the one or more messages to be displayed as the one or more notifications in the activity feed.

20. The system of claim 15, wherein the operations further comprise:

maintaining a plurality of versions of the content item and version data associated with creation of each of the plurality of versions, wherein each version of the plurality of versions of the content item includes a timestamp and a user identifier, and wherein notifications displayed in the activity feed include the timestamp and the user identifier of a computing device that created the version.

* * * * *